(12) United States Patent
Bessette (10) Patent No.: US 10,048,136 B2
(45) Date of Patent: Aug. 14, 2018

(54) MOUNTING FLANGE FOR MEASURING DEVICES

(71) Applicant: Ashcroft, Inc., Stratford, CT (US)

(72) Inventor: Tyler Jon Bessette, Oxford, CT (US)

(73) Assignee: Ashcroft, Inc., Stratford, CT (US)

( * ) Notice: Subject to any disclaimer, the term of this patent is extended or adjusted under 35 U.S.C. 154(b) by 0 days.

(21) Appl. No.: 15/386,585

(22) Filed: Dec. 21, 2016

(65) Prior Publication Data

US 2018/0172519 A1    Jun. 21, 2018

(51) Int. Cl.
| | | |
|---|---|---|
| *G12B 9/00* | (2006.01) | |
| *G01K 1/14* | (2006.01) | |
| *G01L 19/00* | (2006.01) | |
| *F16B 2/24* | (2006.01) | |

(52) U.S. Cl.
CPC ................ *G01K 1/14* (2013.01); *F16B 2/245* (2013.01); *G01L 19/00* (2013.01)

(58) Field of Classification Search
CPC . G01K 1/08; G01K 1/14; G01D 11/24; F16B 2/245
USPC .................................. 73/431, 700; 248/27.3
See application file for complete search history.

(56) References Cited

U.S. PATENT DOCUMENTS

| | | | |
|---|---|---|---|
| 7,437,936 B1 * | 10/2008 | Bessette .................. | G01K 1/08 361/283.1 |
| 7,628,068 B2 * | 12/2009 | Bessette ................. | G01D 11/24 220/200 |

OTHER PUBLICATIONS

PCT International Search Report and Written Opinion dated Jan. 25, 2018.

* cited by examiner

*Primary Examiner* — Todd M Epps
(74) *Attorney, Agent, or Firm* — McCarter & English, LLP (57) ABSTRACT

Advantageous mounting flanges for measuring devices and related methods of use are provided. The present disclosure provides advantageous mounting flanges configured to be mounted to measuring devices/instruments (e.g., pressure or temperature measuring devices/instruments), and related methods of use. More particularly, the present disclosure provides advantageous systems/methods for the design and use of user-friendly press-on mounting flanges configured to be mounted to pressure and temperature instruments (e.g., to the case of pressure or temperature gauges) to allow the instruments to be secured to a supporting structure (e.g., to a panel) via the mounting flanges. Disclosed herein is an advantageous mounting flange configured to be mounted to a case of a measuring device/gauge, thereby allowing the measuring device/gauge to be mounted to and held in a panel via the mounting flange. As such, the gauge case mounting flange is configured to hold the measuring gauge in place in the panel.

20 Claims, 5 Drawing Sheets

MOUNTING FLANGE FOR MEASURING DEVICES

FIELD OF THE DISCLOSURE

The present disclosure relates to mounting flanges configured to be mounted to measuring devices/instruments (e.g., pressure or temperature measuring devices/instruments) and, more particularly, to the design and use of user-friendly press-on mounting flanges configured to be mounted to pressure and temperature instruments (e.g., to the case of pressure or temperature gauges) to allow the instruments to be secured to a supporting structure (e.g., to a panel member or the like) via the mounting flanges.

BACKGROUND OF THE DISCLOSURE

In general, measuring devices, such as instruments and gauges used for measuring temperature and pressure, have innumerable uses in industry. For example, pressure gauges to measure the pressure of process media are well known. Pressure gauges are useful in a myriad of different environments for commercial and industrial applications. Some exemplary assemblies/systems in this general field are described and disclosed in U.S. Pat. Nos. 7,437,936 and 7,628,068, the entire contents of each being hereby incorporated by reference in their entireties.

There are some conventional panel mounting flange designs for measuring devices in the marketplace.

One conventional design is referred to as factory press fit. In this design, the measuring device/gauge comes with the flange pre-installed and is held together with an interference fit. These designs generally need mechanical assistance to assemble.

Another is the capturing flange design. Such flanges typically do not go around the gauge case at all. Instead, the flanges trap the gauge window against the panel from the front, and the front bezel of the gauge is used to keep the gauge from falling though the panel hole. These designs often allow easy rotation of the gauge when in place, which can be undesirable.

Another approach incorporates welded/adhered flanges. For example, this is where the flange is permanently attached to the outside diameter of the gauge case via a weld or sometimes an adhesive. These typically must be fabricated at the manufacturer of the product.

Another design utilizes rear fixed flanges. These designs wrap around the gauge case and attach to the rear of the gauge typically via screws. These are sometimes able to be assembled by the customer but can require additional parts.

An interest exists for improved mounting flanges for measuring devices, and related methods of use. These and other inefficiencies and opportunities for improvement are addressed and/or overcome by the assemblies, systems and methods of the present disclosure.

SUMMARY OF THE DISCLOSURE

The present disclosure provides advantageous mounting flanges configured to be mounted to measuring devices/instruments (e.g., pressure or temperature measuring devices/instruments), and improved methods/systems for using the same. More particularly, the present disclosure provides improved systems/methods for the design and use of user-friendly press-on mounting flanges configured to be mounted to pressure and temperature instruments (e.g., to the case of pressure or temperature gauges) to allow the instruments to be secured to a supporting structure (e.g., to a panel member or the like) via the mounting flanges.

In exemplary embodiments, disclosed herein is an advantageous mounting flange configured to be mounted (e.g., releasably press-on mounted) to a case of a measuring device/gauge, thereby allowing the measuring device/gauge to be mounted to and held in a panel member via the mounting flange. As such, the gauge case mounting flange is configured to securely hold the measuring gauge in place in the panel member.

The present disclosure provides for a measuring device mounting assembly including a mounting flange having a front wall and a rear wall, the front wall extending from an inner perimeter to an outer perimeter, and the rear wall extending from the inner perimeter to the outer perimeter; a central opening through the front and rear walls; a first grip member extending from the rear wall, and a second grip member extending from the rear wall; wherein the first and second grip members are each configured and dimensioned to releasably abut against a measuring device to releasably secure the mounting flange to the measuring device.

The present disclosure also provides for a measuring device mounting assembly wherein the measuring device is a pressure or temperature measuring device. The present disclosure also provides for a measuring device mounting assembly wherein the first and second grip members extend from the rear wall and angle toward a central longitudinal axis of the central opening.

The present disclosure also provides for a measuring device mounting assembly further including a first aperture extending through the front and rear walls, the first aperture configured to be aligned with a hole of a supporting structure to mount the measuring device and the releasably secured mounting flange relative to an aperture of the supporting structure.

The present disclosure also provides for a measuring device mounting assembly wherein the supporting structure is a panel member.

The present disclosure also provides for a measuring device mounting assembly wherein the front wall is a circular or ring-like front wall, and the rear wall is a circular or ring-like rear wall; and wherein the planar surface defined by the front wall is substantially parallel to the planar surface defined by the rear wall.

The present disclosure also provides for a measuring device mounting assembly wherein the first and second grip members each include an extending portion and a gripping portion, each gripping portion configured and dimensioned to releasably grip against a case of the measuring device to releasably secure the mounting flange to the measuring device, with each gripping portion providing a spring-force against the case.

The present disclosure also provides for a measuring device mounting assembly wherein the first and second grip members each define a curved arcuate wall portion that extends from a first end to a second end.

The present disclosure also provides for a measuring device mounting assembly further including third, fourth, fifth and sixth grip members extending from the rear wall; and wherein the third, fourth, fifth and sixth grip members are each configured and dimensioned to releasably abut against the measuring device to releasably secure the mounting flange to the measuring device.

The present disclosure also provides for a measuring device mounting assembly wherein the first, second, third, fourth, fifth and sixth grip members are each spaced equidistantly apart from each adjacent respective grip member around the rear wall.

The present disclosure also provides for a measuring device mounting assembly further including an outer wall that extends from the rear wall, the outer wall extending around the outer perimeter of the rear wall; wherein the outer wall is configured to abut against a front wall of a supporting structure when the measuring device and the releasably secured mounting flange are mounted to the supporting structure.

The present disclosure also provides for a measuring device mounting assembly wherein the measuring device is positioned within the central opening when the mounting flange is releasably secured to the measuring device.

The present disclosure also provides for a measuring device mounting assembly wherein the front wall of the mounting flange is configured to be positioned adjacent to a rear side of a front ring or bezel of the measuring device when the mounting flange is releasably secured to the measuring device.

The present disclosure also provides for a measuring device mounting assembly wherein the first, second, third, fourth, fifth and sixth grip members each extend about 30° around the inner perimeter of the rear wall.

The present disclosure also provides for a measuring device mounting assembly further including second and third apertures extending through the front and rear walls, the second and third apertures each configured to be aligned with a respective hole of the supporting structure to mount the measuring device and the releasably secured mounting flange relative to the aperture of the supporting structure.

The present disclosure also provides for a measuring device mounting assembly wherein the first, second and third apertures are each spaced about 120° apart from each adjacent respective aperture around the front and rear walls.

The present disclosure also provides for a measuring device mounting assembly wherein the mounting flange is configured to be releasably secured to the measuring device utilizing user force.

The present disclosure also provides for a measuring device mounting assembly wherein the releasably secured mounting flange is configured to be removed from the measuring device utilizing user force.

The present disclosure also provides for a measuring device mounting assembly including a mounting flange having a circular or ring-like front wall and a circular or ring-like rear wall, the front wall extending from an inner perimeter to an outer perimeter, and the rear wall extending from the inner perimeter to the outer perimeter; a central opening through the front and rear walls; a first aperture extending through the front and rear walls; first and second grip members extending from the rear wall, the first and second grip members angled toward a central longitudinal axis of the central opening; wherein the first and second grip members each include an extending portion and a gripping portion, each gripping portion configured and dimensioned to releasably grip against a case of a measuring device to releasably secure the mounting flange to the measuring device, with each gripping portion providing a spring-force against the case; wherein the measuring device is positioned within the central opening when the mounting flange is releasably secured to the measuring device; wherein the front wall of the mounting flange is configured to be positioned adjacent to a rear side of a front ring or bezel of the measuring device when the mounting flange is releasably secured to the measuring device; wherein the mounting flange is configured to be releasably secured to the measuring device utilizing user force; and wherein the first aperture is configured to be aligned with a hole of a supporting structure to mount the measuring device and the releasably secured mounting flange relative to an aperture of the supporting structure.

The present disclosure also provides for a measuring device mounting assembly including a mounting flange having a front wall and a rear wall, the front wall extending from an inner perimeter to an outer perimeter, and the rear wall extending from the inner perimeter to the outer perimeter; a central opening through the front and rear walls; first, second, third, fourth, fifth and sixth grip members extending from the rear wall, the first, second, third, fourth, fifth and sixth grip members angled toward a central longitudinal axis of the central opening; an outer wall that extends from the rear wall, the outer wall extending around the outer perimeter of the rear wall; wherein the first, second, third, fourth, fifth and sixth grip members are each spaced equidistantly apart from each adjacent respective grip member around the rear wall; wherein the first, second third, fourth, fifth and sixth grip members are each configured and dimensioned to releasably abut against a measuring device to releasably secure the mounting flange to the measuring device; wherein the mounting flange is configured to be releasably secured to the measuring device utilizing user force; and wherein the outer wall is configured to abut against a front wall of a supporting structure when the measuring device and the releasably secured mounting flange are mounted to the supporting structure.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF DISCLOSURE

The exemplary embodiments disclosed herein are illustrative of advantageous mounting flanges for measuring devices, and systems of the present disclosure and methods/techniques thereof. It should be understood, however, that the disclosed embodiments are merely exemplary of the present disclosure, which may be embodied in various forms. Therefore, details disclosed herein with reference to exemplary assemblies/fabrication methods and associated processes/techniques of assembly and use are not to be interpreted as limiting, but merely as the basis for teaching one skilled in the art how to make and use the advantageous assemblies/systems and/or alternative assemblies of the present disclosure.

The present disclosure provides mounting flanges for measuring devices, and related methods of use. The present disclosure provides advantageous mounting flanges configured to be mounted to measuring devices/instruments (e.g., pressure or temperature measuring devices/instruments), and related methods of use. More particularly, the present disclosure provides advantageous systems/methods for the design and use of user-friendly press-on mounting flanges configured to be mounted to pressure and temperature instruments (e.g., to the case of pressure or temperature gauges) to allow the instruments to be secured to a supporting structure (e.g., to a panel member or the like) via the mounting flanges.

In general, disclosed herein is an advantageous mounting flange configured to be mounted (e.g., releasably press-on mounted) to a case of a measuring device/gauge, thereby allowing the measuring device/gauge to be mounted to and held in a panel member via the mounting flange. As such, the gauge case mounting flange is configured to securely hold the measuring gauge in place in the panel member.

In exemplary embodiments, the present disclosure provides for improved assemblies/methods for utilizing mounting flanges for measuring devices. For example, the assemblies/methods advantageously allow an end user to assemble the mounting flange to the measuring device in the field. The mounting flange also holds the case of the measuring device with adequate grip such that the flange will not easily rotate radially relative to the case, and the flange will not easily slide/move axially away from the bezel/front ring of the measuring device. The assemblies/systems also advantageously allow for the securement of the mounting flange to the measuring device without additional manufacturing steps or equipment (e.g., welders, presses, adhesive dispensers, etc.), and the mounting flange holds itself in place to the measuring device without the need for additional fasteners. As such, the above noted improvements of the systems/assemblies of the present disclosure thereby eliminate drawbacks of conventional designs, and also provide significant manufacturing, operational and/or commercial advantages as a result.

Referring now to the drawings, like parts are marked throughout the specification and drawings with the same reference numerals, respectively. Drawing figures are not necessarily to scale and in certain views, parts may have been exaggerated for purposes of clarity.

With reference to FIGS. 1-10, there is illustrated an embodiment of an exemplary mounting flange 10 according to the present disclosure. In general, mounting flange 10 is configured and dimensioned to be mounted to a measuring device/instrument 11 (e.g., a pressure or a temperature measuring device/instrument 11).

In exemplary embodiments and as discussed further below, mounting flange 10 takes the form of a user-friendly press-on mounting flange 10 configured to be mounted to the case 12 of a measuring device 11 (e.g., to the case 12 of a pressure or a temperature gauge 11) to allow the measuring device 11 to be secured to a supporting structure 13 (e.g., to a panel member 13 or the like) via the mounting flange 10.

In certain embodiments, the advantageous mounting flange 10 is configured to be releasably press-on mounted to a case 12 of a measuring device/gauge 11, thereby allowing the measuring device/gauge 11 to be mounted to and held in a panel member 13 via the mounting flange 10. As such, an exemplary gauge case mounting flange 10 is configured to securely hold the measuring device/gauge 11 in place in the panel member 13 or the like.

With reference to FIGS. 1-3 and 9-10, there is illustrated an exemplary measuring device 11 having a case 12 secured to a ring 14 (e.g., substantially circular and/or cylindrical ring 14). Measuring device 11 may be a pressure measuring device, including, but not limited to, a pressure gauge, a pressure transducer or the like. In another embodiment, measuring device 11 is a temperature measuring device. However, pressure or temperature measuring devices 11 are not the only measuring devices that could be used in accordance with the principles of the present disclosure, as will be readily apparent to persons skilled in the art from the description provided herein.

In certain embodiments, measuring device 11 may be operatively coupled to a container such as a tank, a pipe, a pressurized reactor or the like in order to measure a condition to be measured, whether it be temperature, pressure or some other value, utilizing a measuring device mechanism, such as, for example, a Bourden tube or the like.

In general, case 12 of measuring device 11 is configured and dimensioned to house and protect the measuring device mechanism of measuring device 11. Exemplary case 12 is substantially circular and/or cylindrical, although the present disclosure is not limited thereto.

Figure 4:
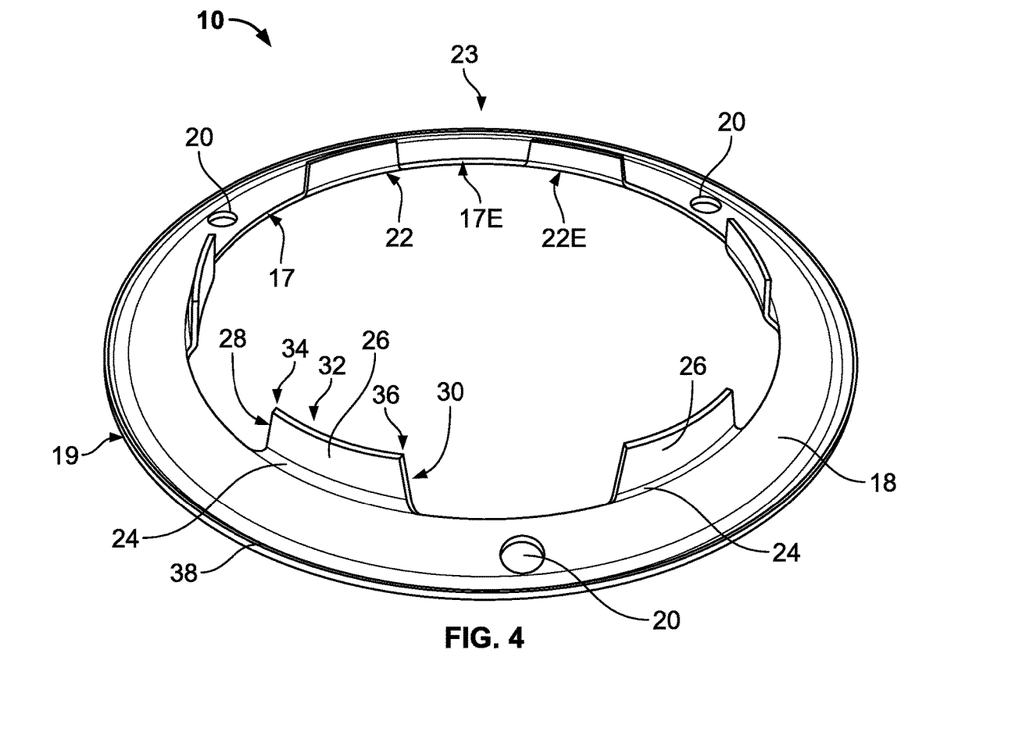
FIG. 4 is a rear side perspective view of the mounting flange of FIG. 1.
Figure 5:
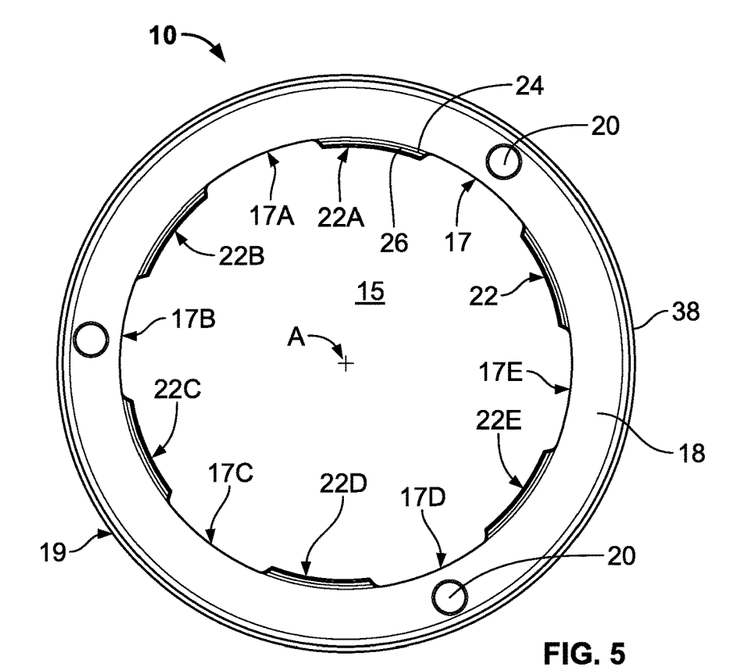
FIG. 5 is a rear view of the mounting flange of FIG. 1.
Figure 6:
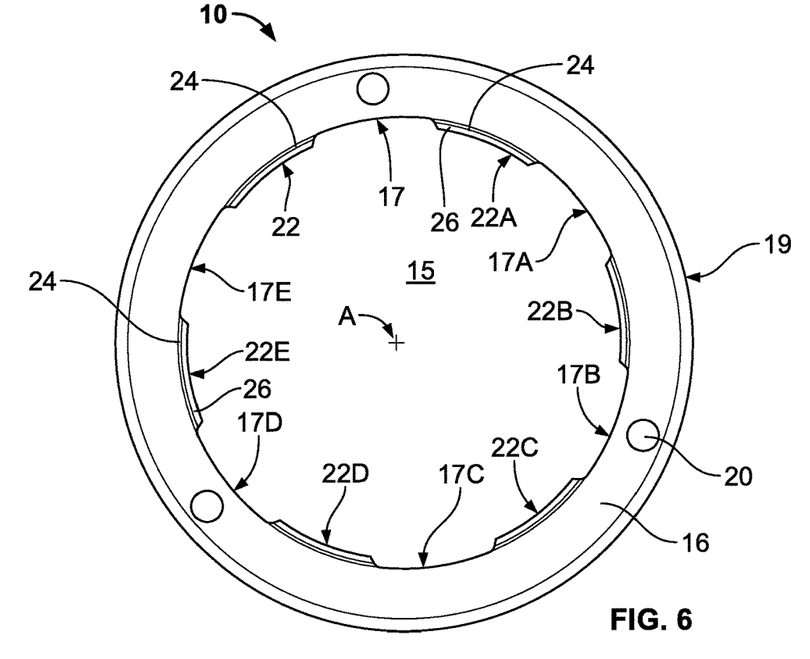
FIG. 6 is a front view of the mounting flange of FIG. 1.
Figure 7:
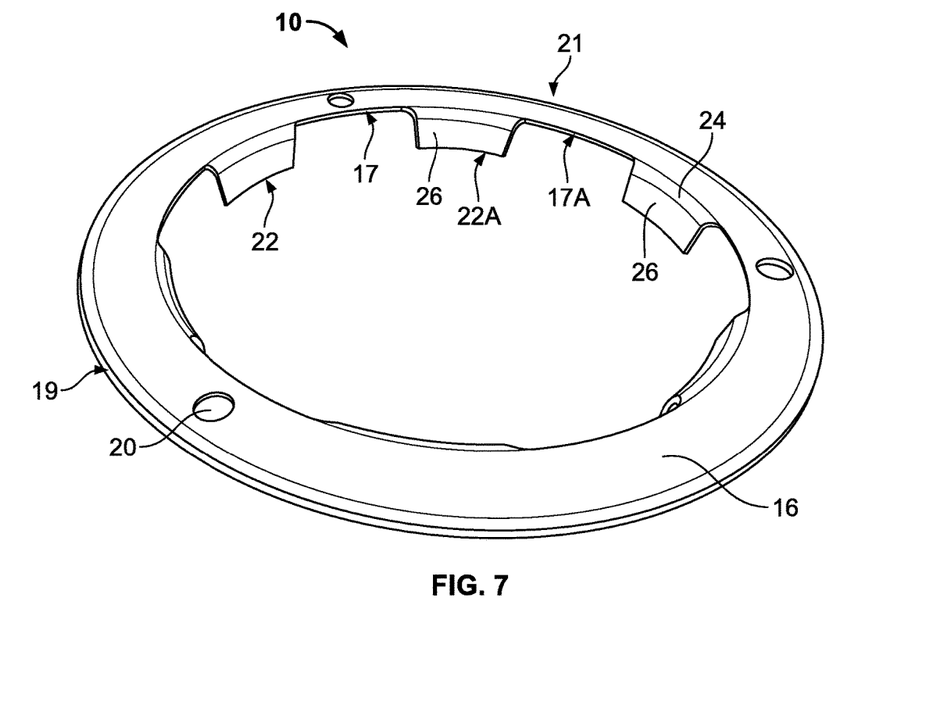
FIG. 7 is a front side perspective view of the mounting flange of FIG. 1.
Figure 8:
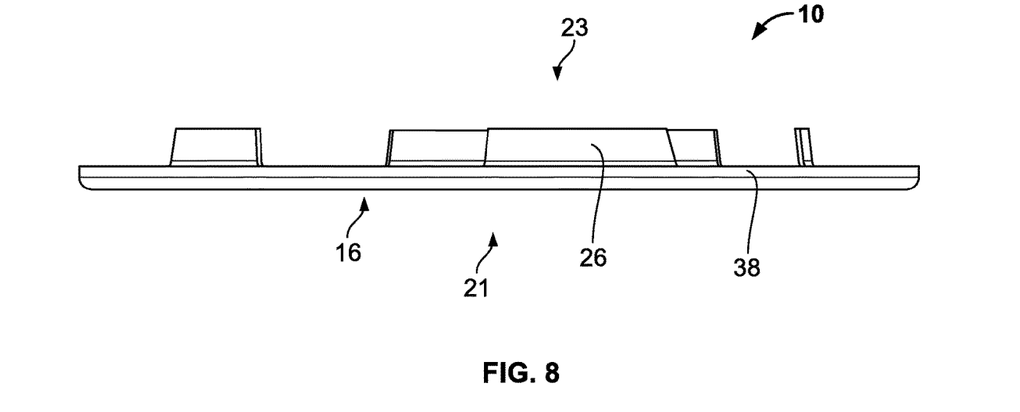
FIG. 8 is a side view of the mounting flange of FIG. 1.

With reference to FIGS. 4-7, exemplary mounting flange 10 is substantially circular and/or cylindrical and includes a central opening 15 therethrough, although the present disclosure is not limited thereto. Rather, it is noted that mounting flange 10 can take a variety of shapes/forms (e.g., non-polygonal or polygonal shapes/forms). As shown in FIGS. 4, 7 and 8, mounting flange 10 includes a front side 21 and a rear side 23.

In exemplary embodiments, the front side 21 of mounting flange 10 includes a front wall 16 (e.g., circular or ring-like front wall 16) that extends from an inner diameter or perimeter 17 to an outer diameter or perimeter 19, and the rear side 23 includes a rear wall 18 (e.g., circular or ring-like rear wall 18) that extends from the inner diameter/perimeter 17 to the outer diameter/perimeter 19. As discussed further below, portions of inner diameter/perimeter 17 (e.g., portions 17-17E) of walls 16, 18 define portions of the inner perimeter of mounting flange 10.

In certain embodiments, the planar surface defined by front wall 16 is substantially parallel to the planar surface defined by rear wall 18.

As shown in FIGS. 1-7, front and rear walls 16, 18 include at least one aperture 20 therethrough. In exemplary embodiments, walls 16, 18 include three apertures 20 therethrough, with each aperture 20 spaced equidistantly apart from each adjacent aperture 20 around walls 16, 18 (e.g., with each aperture 20 spaced about 120° apart from each adjacent aperture 20 around walls 16, 18). It is noted that walls 16, 18 can include any suitable number of apertures 20, with the apertures spaced apart from one another a variety of distances.

Mounting flange 10 also includes one or more grip members 22. For example, front and rear walls 16, 18 can include a plurality of grip members 22 extending therefrom. In certain embodiments and as discussed further below, front and rear walls 16, 18 include six grip members 22 (e.g., grip members 22-22E) extending therefrom.

In exemplary embodiments, each grip member 22 (e.g., each grip member 22 to 22E) includes an extending portion 24 and a gripping portion 26. Each gripping portion 26 is configured and dimensioned to releasably grip, mount or abut against case 12 of measuring device 11 for mounting purposes of measuring device 11 (FIGS. 1-3), with each gripping portion 26 providing a spring-force against case 12.

Figure 1:
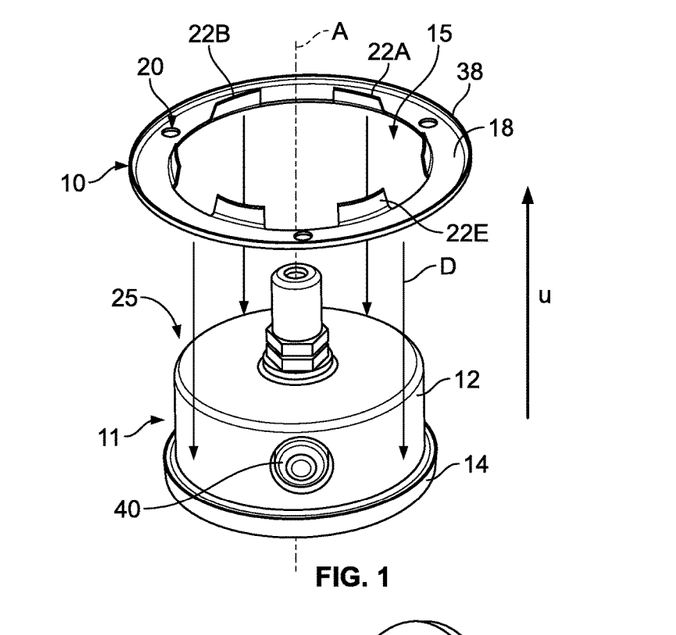
FIG. 1 is a rear side perspective view of an exemplary mounting flange and measuring device, prior to assembly to one another.

Each extending portion 24 extends inward from the inner diameter 17 of walls 16, 18 toward the central longitudinal axis A of central opening 15 (FIGS. 1, 5 and 6). In certain embodiments, each extending portion 24 can be substantially co-planar with walls 16, 18, with each portion 24 extending laterally inward from the inner diameter 17 of walls 16, 18 toward the central longitudinal axis A of central opening 15.

In other embodiments, each extending portion 24 is angled relative to wall 16 and/or 18, with each portion 24 extending inward from the inner diameter 17 of walls 16, 18 toward the central longitudinal axis A of central opening 15. It is also noted that each extending portion 24 can extend toward rear side 23.

Each exemplary gripping portion 26 extends from its extending portion 24 inward toward the central longitudinal axis A of central opening 15, and extends toward the rear side 23 of mounting flange 10. In exemplary embodiments, each gripping portion 26 is angled relative to its extending portion 24, and is angled relative to walls 16, 18.

In some embodiments, it is noted that grip members 22 may not include an extending portion 24, and may only include a gripping portion 26. In such cases, each gripping portion 26 extends from walls 16, 18 inward toward the central longitudinal axis A of central opening 15, and extends toward the rear side 23 of mounting flange 10.

Figure 2:
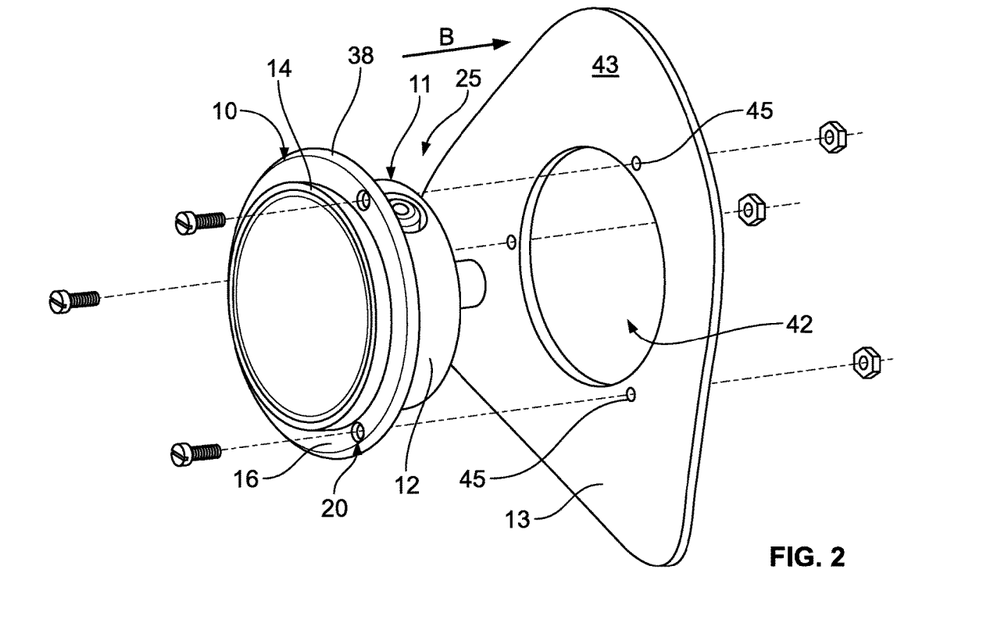
FIG. 2 is a front side perspective view of the mounting flange and measuring device of FIG. 1, prior to assembly to a panel member.
Figure 3:
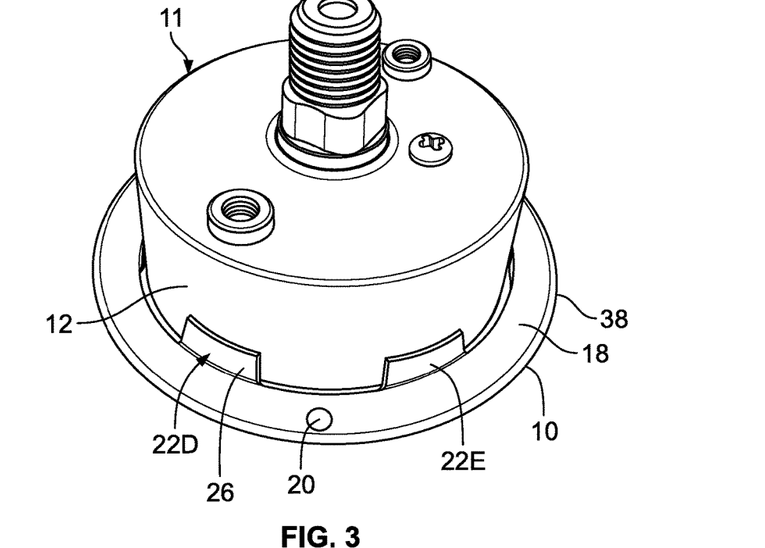
FIG. 3 is a rear side perspective view of the mounting flange and measuring device of FIG. 1, after assembly to one another.

In exemplary embodiments and as shown in FIG. 4, each gripping portion 26 defines a curved arcuate wall portion 26 that extends from a first end 28 to a second end 30, and that extends from the extending portion 24 to a top end 32. In some embodiments, it is noted that the top corners 34, 36 of portion 26 are not chamfered or the like, and these top corners 34, 36 are configured and dimensioned to grip, bite and/or abut against case 12 when each gripping portion 26 is releasably mounted or abutted against case 12 of measuring device 11 for mounting purposes of measuring device 11 (FIGS. 1-3).

In certain embodiments and as shown in FIGS. 4-7, flange 10 includes six grip members 22, 22A, 22B, 22C, 22D, 22E. It is noted that flange 10 can include any suitable number of grip members 22, 22A, etc. (e.g., one, two, three, four, a plurality, etc.).

In exemplary embodiments, flange 10 includes six grip members 22 (e.g., 22, 22A, 22B, 22C, 22D, 22E), with each grip member 22 spaced equidistantly apart from each adjacent grip member 22 around walls 16, 18 (e.g., with each grip member 22 spaced about 30° apart from each adjacent grip member 22 around walls 16, 18). Again, it is noted that flange 10 can include any suitable number of grip members 22, with the grip members 22 spaced apart from one another a variety of distances.

In an embodiment and as shown in FIGS. 5-6, flange 10 includes six grip members 22 (e.g., 22-22E) with each grip member 22 spaced equidistantly apart from each adjacent grip member 22 around walls 16, 18 (e.g., with each grip member 22 spaced about 30° apart from each adjacent grip member 22 around walls 16, 18), and flange 10 includes a respective portion of inner diameter 17 (e.g., portions 17-17E) positioned between respective grip members 22 to define the inner perimeter of mounting flange 10.

In some embodiments, each grip member 22 extends about 30° around the inner perimeter of mounting flange 10, and each respective portion 17-17E positioned between respective grip members 22 extends about 30° around the inner perimeter of mounting flange 10.

In exemplary embodiments and as shown in FIGS. 3-5 and 8, an outer wall 38 extends from rear wall 18 toward rear side 23 of flange 10. In certain embodiments, the planar surface defined by outer wall 38 extends substantially transverse or perpendicular to the planar surface defined by rear wall 18 (and/or transverse/perpendicular to front wall 16). Stated another way, outer wall 38 can be connected to and oriented transverse to rear wall 18.

Exemplary outer wall 38 extends around the outer perimeter/circumference of the rear wall 18 of flange 10 (e.g., around the outer diameter 19 of wall 18), although the present disclosure is not limited thereto. It is noted that outer wall 38 can extend a variety of distances away from rear wall and toward rear side 23. In some embodiments, wall 38 can be angled toward or away from axis A.

Exemplary wall 38 provides rigidity to flange 10 so that flange 10 stays in a ring-shape configuration (e.g., when mounted to device 11 and to panel 13).

In use and as shown in FIGS. 1-3 and 9-10, a user can position the front side 21 of flange 10 above/behind the rear side 25 of measuring device 11 (FIG. 1). As shown in FIG. 1, a user can then move the flange 10 in the direction of Arrow D toward the rear side 25 of device 11 until the rear side 25 of case 12 is positioned within the central opening 15 of flange 10.

As the flange 10 is moved in the direction of Arrow D toward the rear side of ring/bezel 14 of device 11, at least portions of each gripping member 22 (e.g., portions of members 22-22E) will mount and/or abut against case 12 to releasably secure flange 10 to case 12 of device 11.

In exemplary embodiments and as noted above, each gripping portion 26 of each member 22 is configured and dimensioned to releasably grip, mount or abut against case 12 of measuring device 11 for mounting purposes of measuring device 11 (FIGS. 1-3), with each gripping portion 26 providing a spring-force against case 12. Moreover and in some embodiments, the top corners 34, 36 of each portion 26 may not be chamfered or the like, and these top corners 34, 36 are configured and dimensioned to grip, bite and/or abut against case 12 when each gripping portion 26 is releasably mounted or abutted against case 12 of measuring device 11.

Furthermore and in certain embodiments, each gripping portion 26 can extend/angle from walls 16, 18 inward toward the central longitudinal axis A of central opening 15 toward the rear side 23 of mounting flange 10, and the inwardly angled gripping portions 26 can help provide a spring-force against case 12 when gripping members 22 releasably grip, mount or abut against case 12 of measuring device 11.

Figure 10:
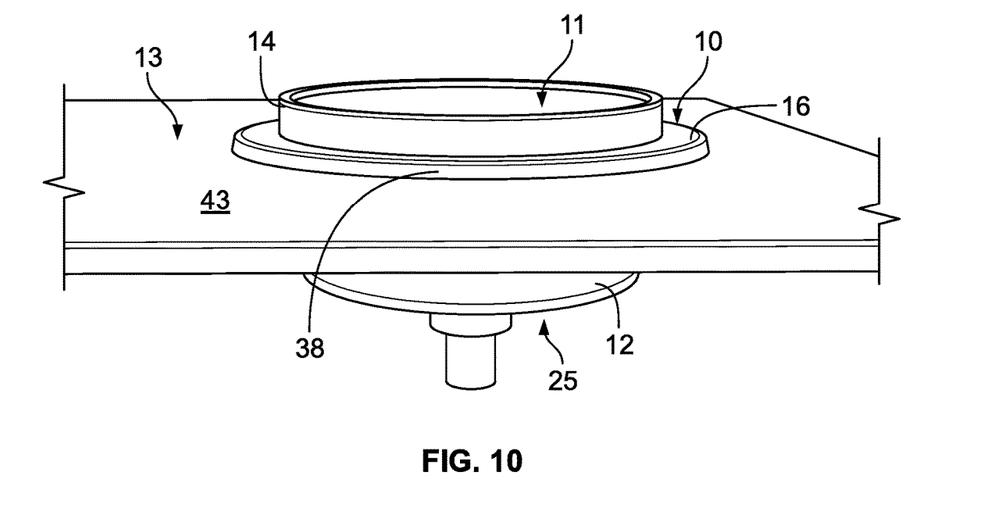
FIG. 10 is a side perspective view of the mounting flange and measuring device of FIG. 9, after assembly to a panel member.

Flange 10 is configured to allow user force (e.g., handheld user force) to push or press the flange 10 onto the case 12 with at least portions of each gripping member 22 mounting or abutting against case 12, and allowing the user force to move the flange 10 until portions of front wall 16 abut against or is positioned near/adjacent the rear side of front ring/bezel 14 of device 11 (FIGS. 2 and 10).

In exemplary embodiments, only portions of each gripping member 22 (e.g., portions of top end 32 and/or top corners 34, 36 of gripping portions 26) come into contact or abutment with case 12 as flange 10 is moved toward the rear side of ring 14. In other embodiments, other sections of gripping member 22 (e.g., lower sections below top end 32 and/or sections of portion 24) come into contact or abutment with case 12 as flange 10 is moved toward the rear side of ring 14.

In some embodiments, it is noted that when only portions of each gripping member 22 come into contact/abutment with case 12 as flange 10 is moved toward the rear side of ring 14, the inner diameter sections 17 (e.g., sections 17-17E) positioned between the gripping members 22-22E do not come into contact/abutment with case 12 as flange 10 is moved toward the rear side of ring 14.

In other embodiments, at least portions of the inner diameter sections 17-17E positioned between the gripping members 22-22E do come into contact/abutment with case 12 as flange 10 is moved toward the rear side of ring 14 (as well as portions of each gripping member 22).

Prior to moving the flange 10 in the direction of Arrow D toward the rear side of ring 14 (FIG. 1), a user can align one of the apertures 20 above or behind the gauge/device fill plug 40, and then the user can press and move the flange, utilizing user-force (e g, hand-pressing force), in the direction of Arrow D onto the back of the case 12 with the gripping members 22 contacting the case 12, and then continue moving the flange 10 with the hand-pressing force until front wall 16 abuts against or near the rear side of ring/bezel 14 of device 11 (FIG. 2). In exemplary embodiments, a user can utilize substantially even hand-pressed force around flange 10 and in the direction of Arrow D to prevent warping of flange 10 as it forms around case 12 and as it moves toward the rear side of ring 14.

After the flange 10 is moved/pressed until wall 16 abuts against or is positioned near/adjacent the rear side of ring/bezel 14 (FIGS. 2-3), a user can then position the rear side 25 of device 11 with mounted flange 10 in an aperture 42 of a supporting structure 13 or panel member 13 or the like. More particularly, a user can position the device 11 with mounted flange 10 relative to aperture 42 of member 13 as shown in FIG. 2. A user can then move the rear side 25 of device 11 in the direction of Arrow B, with the rear side 25 of device 11 moving through the aperture 42 until the outer wall 38 of flange 10 abuts against the front wall 43 of member 13 (FIGS. 9-10).

Figure 9:
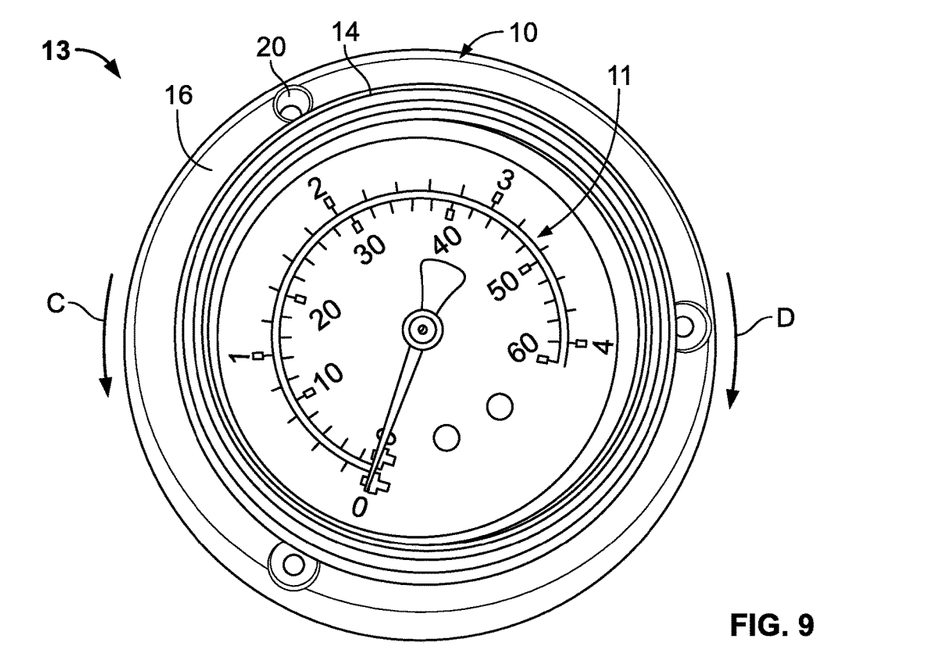
FIG. 9 is a front view of the mounting flange and measuring device of FIG. 1, after assembly to a panel member.

In certain embodiments and in this position as shown in FIGS. 9-10, substantially only outer wall 38 contacts front wall 43, and a user is free to rotate device 11 with mounted flange 10 in a circular fashion within and relative to aperture 42 (e.g., in the direction of Arrow C of FIG. 9, or in the direction of Arrow D in FIG. 9). As such, a user can rotate device 11 with mounted flange 10 until each aperture 20 of flange 10 is aligned with a respective hole 45 of member 13. A fastener member (e.g., a screw or the like) can then be fastened/secured through apertures 20 and holes 45 to releasably secure device 11 with mounted flange 10 to member 13.

It is noted that device 11 with mounted flange 10 can thereafter be unsecured from member 13 by removing fasteners from apertures 20 and holes 45, and then removing device 11 and flange 10 from aperture 42. If desired, flange 10 can then be removed from device 11 by user-force by moving the flange 10 in the direction of Arrow U in FIG. 1 until the gripping members 22 no longer contact case 12, and flange is free from device 11 (FIG. 1). Flange 10 can be secured and un-secured and re-secured, etc., from or to device 11 or other devices 11 as needed/desired (e.g., flange 10 is reusable; flange 10 can be utilized with several different devices 11 at different times, etc.).

Referring again to FIGS. 2-3, after the flange 10 is moved/pressed until wall 16 abuts against or is positioned near/adjacent the rear side of ring/bezel 14, it is noted that the gripping members 22 of mounting flange 10 holds the case 12 of the measuring device 11 with adequate grip such that the flange 10 will not easily rotate radially relative to the case 12 (e.g., in the direction of Arrow C or Arrow D in FIG. 9), and the flange 10 will not easily slide/move axially away from the bezel/front ring 14 of the measuring device 11 in the direction of Arrow U of FIG. 1.

Tests have been performed on exemplary flanges 10. For example, an exemplary flange 10 was pressed onto a 63 mm device 11. Some goals were to prove that the flange 10 could rigidly hold the pressure gauge 11 in place, be assembled by hand with no tools, and not deform from the assembly process. All of these goals were successful, as the pressure gauge 11 was held by the gripping members 22 with significant resistance to rotation such that the flange 10 would not easily rotate radially relative to the case 12, and the flange 10 would not easily slide/move axially away from the bezel/front ring 14 of the measuring device 11 in the direction of Arrow U of FIG. 1. Moreover, the mounted flange 10 maintained its appearance.

In exemplary embodiments and as discussed above, the present disclosure provides an advantageous panel mounting flange 10 intended to be used with pressure and temperature instrumentation 11. It is noted that panels 13 are sometimes used by end users to create gauge 11 clusters (e.g., like the dashboard of an automobile). This can give the machine operator feedback on the function or stations of the machine they are using. Exemplary flange 10 holds the instrument 11 in place in the panel 13.

The assemblies/methods and exemplary flanges 10 of the present disclosure provide several advantages. For example, the assemblies/methods advantageously allow an end user to assemble (e.g., assemble by hand) the mounting flange 10 to the measuring device 11 in the field. The mounting flange 10 also grips/holds the case 12 of the measuring device 11 with adequate grip such that the flange 10 will not easily rotate radially relative to the case 12, and the flange 10 will not easily slide/move axially away from the bezel/front ring 14 of the measuring device 11. The systems also advantageously allow for the securement of the mounting flange 10 to the measuring device 11 without additional manufacturing steps or equipment (e.g., without welds, welders, presses, adhesive dispensers, etc.), and the mounting flange 10 holds itself in place to the measuring device 11 without the need for additional fasteners or the like. As such, the above noted improvements of the systems/assemblies of the present disclosure thereby eliminate drawbacks of conventional designs, and also provide significant manufacturing, operational and/or commercial advantages as a result.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A measuring device mounting assembly comprising:
    a mounting flange having a front wall and a rear wall, the front wall extending from an inner perimeter to an outer perimeter, and the rear wall extending from the inner perimeter to the outer perimeter;
    a central opening through the front and rear walls;
    a first grip member extending from the rear wall, and a second grip member extending from the rear wall;
    wherein the first and second grip members are each configured and dimensioned to releasably abut against a measuring device to releasably secure the mounting flange to the measuring device.

2. The assembly of claim 1, wherein the measuring device is a pressure or temperature measuring device.

3. The assembly of claim 1, wherein the first and second grip members extend from the rear wall and angle toward a central longitudinal axis of the central opening.

4. The assembly of claim 1, wherein the front wall is a circular or ring-like front wall, and the rear wall is a circular or ring-like rear wall; and
    wherein the planar surface defined by the front wall is substantially parallel to the planar surface defined by the rear wall.

5. The assembly of claim 1, wherein the first and second grip members each include an extending portion and a gripping portion, each gripping portion configured and dimensioned to releasably grip against a case of the measuring device to releasably secure the mounting flange to the measuring device, with each gripping portion providing a spring-force against the case.

6. The assembly of claim 1, wherein the first and second grip members each define a curved arcuate wall portion that extends from a first end to a second end.

7. The assembly of claim 1 further comprising an outer wall that extends from the rear wall, the outer wall extending around the outer perimeter of the rear wall;
    wherein the outer wall is configured to abut against a front wall of a supporting structure when the measuring device and the releasably secured mounting flange are mounted to the supporting structure.

8. The assembly of claim 1, wherein the measuring device is positioned within the central opening when the mounting flange is releasably secured to the measuring device.

9. The assembly of claim 1, wherein the front wall of the mounting flange is configured to be positioned adjacent to a rear side of a front ring or bezel of the measuring device when the mounting flange is releasably secured to the measuring device.

10. The assembly of claim 1 further comprising a first aperture extending through the front and rear walls, the first aperture configured to be aligned with a hole of a supporting structure to mount the measuring device and the releasably secured mounting flange relative to an aperture of the supporting structure.

11. The assembly of claim 10, wherein the supporting structure is a panel member.

12. The assembly of claim 10 further comprising second and third apertures extending through the front and rear walls, the second and third apertures each configured to be aligned with a respective hole of the supporting structure to mount the measuring device and the releasably secured mounting flange relative to the aperture of the supporting structure.

13. The assembly of claim 12, wherein the first, second and third apertures are each spaced 120° apart from each adjacent respective aperture around the front and rear walls.

14. The assembly of claim 1 further comprising third, fourth, fifth and sixth grip members extending from the rear wall; and
    wherein the third, fourth, fifth and sixth grip members are each configured and dimensioned to releasably abut against the measuring device to releasably secure the mounting flange to the measuring device.

15. The assembly of claim 14, wherein the first, second, third, fourth, fifth and sixth grip members are each spaced equidistantly apart from each adjacent respective grip member around the rear wall.

16. The assembly of claim 14, wherein the first, second, third, fourth, fifth and sixth grip members each extend 30° around the inner perimeter of the rear wall.

17. The assembly of claim 1, wherein the mounting flange is configured to be releasably secured to the measuring device utilizing user force.

18. The assembly of claim 17, wherein the releasably secured mounting flange is configured to be removed from the measuring device utilizing user force.

19. A measuring device mounting assembly comprising:
    a mounting flange having a circular or ring-like front wall and a circular or ring-like rear wall, the front wall extending from an inner perimeter to an outer perimeter, and the rear wall extending from the inner perimeter to the outer perimeter;
    a central opening through the front and rear walls;
    a first aperture extending through the front and rear walls;
    first and second grip members extending from the rear wall, the first and second grip members angled toward a central longitudinal axis of the central opening;
    wherein the first and second grip members each include an extending portion and a gripping portion, each gripping portion configured and dimensioned to releasably grip against a case of a measuring device to releasably secure the mounting flange to the measuring device, with each gripping portion providing a spring-force against the case;
    wherein the measuring device is positioned within the central opening when the mounting flange is releasably secured to the measuring device;
    wherein the front wall of the mounting flange is configured to be positioned adjacent to a rear side of a front ring or bezel of the measuring device when the mounting flange is releasably secured to the measuring device;

wherein the mounting flange is configured to be releasably secured to the measuring device utilizing user force; and wherein the first aperture is configured to be aligned with a hole of a supporting structure to mount the measuring device and the releasably secured mounting flange relative to an aperture of the supporting structure.

20. A measuring device mounting assembly comprising:

a mounting flange having a front wall and a rear wall, the front wall extending from an inner perimeter to an outer perimeter, and the rear wall extending from the inner perimeter to the outer perimeter;

a central opening through the front and rear walls;

first, second, third, fourth, fifth and sixth grip members extending from the rear wall, the first, second, third, fourth, fifth and sixth grip members angled toward a central longitudinal axis of the central opening;

an outer wall that extends from the rear wall, the outer wall extending around the outer perimeter of the rear wall;

wherein the first, second, third, fourth, fifth and sixth grip members are each spaced equidistantly apart from each adjacent respective grip member around the rear wall;

wherein the first, second third, fourth, fifth and sixth grip members are each configured and dimensioned to releasably abut against a measuring device to releasably secure the mounting flange to the measuring device;

wherein the mounting flange is configured to be releasably secured to the measuring device utilizing user force; and wherein the outer wall is configured to abut against a front wall of a supporting structure when the measuring device and the releasably secured mounting flange are mounted to the supporting structure.

\* \* \* \* \*